US009867127B2

(12) United States Patent
Charugundla (10) Patent No.: US 9,867,127 B2
(45) Date of Patent: *Jan. 9, 2018

(54) FEATURE PACK FOR INTERFACING WITH DEVICES

(71) Applicant: Kent Srikanth Charugundla, New York, NY (US)

(72) Inventor: Kent Srikanth Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/496,451

(22) Filed: Sep. 25, 2014

(65) Prior Publication Data

US 2015/0011268 A1 Jan. 8, 2015

Related U.S. Application Data

(63) Continuation of application No. 13/920,144, filed on Jun. 18, 2013.

(60) Provisional application No. 61/883,345, filed on Sep. 27, 2013, provisional application No. 61/886,566, filed on Oct. 3, 2013.

(51) Int. Cl.
*H04M 1/00* (2006.01)
*H04W 52/02* (2009.01)
*H04B 1/3888* (2015.01)
*H04M 1/02* (2006.01)
*H04B 1/00* (2006.01)

(52) U.S. Cl.
CPC ...... *H04W 52/0209* (2013.01); *H04B 1/3888* (2013.01); *H04M 1/0202* (2013.01); *H04W 52/0251* (2013.01); *Y02B 60/50* (2013.01)

(58) Field of Classification Search
CPC .............. H04B 1/3877; H04B 1/3888; H04B 2001/3894; H04W 52/02
USPC ............................................ 455/90.3, 575.8
See application file for complete search history.

(56) References Cited

U.S. PATENT DOCUMENTS 8,718,728 B2 * 5/2014 Katis ................... H04B 1/3888
455/575.8
2009/0312058 A9 * 12/2009 Wood .................. H04B 1/3888
455/566

* cited by examiner

*Primary Examiner* — Lee Nguyen
(74) *Attorney, Agent, or Firm* — Paul J. Sutton; Barry G. Magidoff (57) ABSTRACT

A feature pack coupled to and interface with a cellular phone is able to relieve the cellular phone from performing tasks that drain the battery of the cell phone thus preserving the power of the battery of the cellular phone. The feature pack has its own battery separate and apart from the battery of the cellular phone and processes signals received from the cellular phone. The feature pack also provides power to various tools mounted onto surfaces of the feature pack.

7 Claims, 10 Drawing Sheets

FEATURE PACK FOR INTERFACING WITH DEVICES

CROSS REFERENCE TO RELATED APPLICATIONS

This application claims the benefit of U.S. Provisional Application No. 61/883,345 filed on Sep. 27, 2013 (and entitled A Feature Pack With Tools For a Portable Device) and U.S. Provisional Application No. 61/886,566 filed on Oct. 3, 2013 (and entitled A Feature Pack With Tools and a Mirror For a Portable Device), both of which are incorporated in their entirety herein by reference.

This application is a continuation-in-part of U.S. application Ser. No. 13/920,144, filed on Jun. 18, 2013 (and entitled A Feature Pack For A Portable Device), which is incorporated in its entirety herein by reference.

BACKGROUND

Field of the Disclosure

The present disclosure generally relates to the field of electronic devices. In particular, the present disclosure provides a feature pack coupled to a portable device to enhance many of the features of the device during operation.

Description of the Related Art

In the past decade, manufacturers of portable communication devices (e.g., smart cellular phones, tablets, laptops, notebooks) have been designing and manufacturing these devices with increasing amounts of new features. While many of the relatively new features are quite useful, the main and most important features are the standard features that existed in the earliest versions of such devices and are still resident in virtually all of these devices. These features are a device's ability to provide relatively high quality of voice signal processing, the ability to play music and the ability to record voice and audio signals. In particular, the audio output power and the quality of the audio output signals when playing music, or when conversing in a telephone conversation or recording a conversation during a meeting are key features.

It is well known by many users of such portable communication devices that the constant use of such main features necessarily results in the drainage of battery power. A portable device operating under reduced battery power inevitably leads to a reduction in the quality of voice, audio related features and other features whose usage tend to significantly drain the battery power of such devices. Also, the range of the volume of the output speakers are necessarily lowered, which makes it difficult to use the device as a speaker phone especially for users who are hearing impaired. Even though the batteries can be recharged to full level (assuming the user has his/her battery charger available), in many cases users are caught with low battery power during inopportune moments such as during important phone calls. Further, after discovering a relatively low battery level, users will often opt to refrain from listening to music and/or opt to switching off the device to save battery power. Neither one of these two options is desirable as each severely limits the usefulness of such devices and is in conflict with the main reasons for which they were designed.

It is therefore a desire of users of such devices to use the features provided by such devices without having to drain the battery power thus avoiding lowered quality of operation of such devices.

SUMMARY

The present disclosure provides a feature pack device which when coupled to and interfaced with a portable device is able to perform a plurality of tasks typically performed by the portable device thus helping to preserve the energy level of the battery of the portable device. The feature pack comprises circuitry controlled by a microprocessor that can be interfaced with a user via user accessible actuators where such circuitry and associated components are able to process the signals from the portable device to perform the plurality of tasks. The feature pack uses a power source for its circuits, components, and user accessible actuators that is separate and distinct from any power source used by the portable device.

In one embodiment, this feature pack disclosure comprises a compartment within which a cellular telephone can be snugly disposed allowing said telephone to couple to and interface with the feature pack. The cellular phone provides a plurality of signals to the feature pack, which processes said signals using a plurality of circuitry, electrical and electronic components and user accessible actuators all of which are separate from the cellular telephone.

In another embodiment, various tools some of which are electrically powered by the battery of the feature pack are mounted fixedly onto surfaces of the feature pack.

BRIEF DESCRIPTION OF THE DRAWINGS

The features and advantages of this disclosure will become more apparent from the detailed description set forth below when taken in conjunction with the drawings in which like reference numbers indicate identical or functionally similar elements.

DETAILED DESCRIPTION

This disclosure provides a feature pack device, which when coupled to and interfaced with a portable device is able to perform a plurality of tasks or many of the features typically performed by the portable device thus helping to reduce the burden on the battery of the portable device and, therefore, helps to preserve the energy level of the battery of the portable device. The feature pack device comprises user accessible actuators coupled (electrically, mechanically or electro-mechanically) to a plurality of circuits to facilitate processing of received portable device signals and to perform tasks heretofore performed by the portable device. The circuitry of the feature pack is controlled by a microprocessor that can be interfaced with a user via the user accessible actuators where such circuitry and associated components are able to process signals from the portable device to perform the tasks and/or provide the features previously done by the portable device, but which are now done by the feature pack. The performance of tasks and/or provision of features by the feature pack using its own power source separate and distinct from any power source of the portable device where such tasks and features were heretofore done by the portable device significantly relieves the power burden on the portable device. The portable device may be electrically, electronically and mechanically coupled to or interfaced (or both) with the feature pack, which performs many of the features using its own power source (e.g., a rechargeable battery), that it uses to power its own circuits and components to process voice, audio, and other types of signals that would normally be processed by the portable device. The feature pack may be coupled and interfaced with the portable device so that both devices may be physically combined into a unit where the feature pack is able to receive signals from the portable device.

In one embodiment, the feature pack comprises a compartment within which a portable device such as a cellular telephone can be snugly disposed allowing said telephone to couple to and interface with the feature pack. The cellular phone provides a plurality of signals to the feature pack, which processes said signals using a plurality of circuitry, electrical and electronic components and user accessible actuators all of which are separate from the cellular telephone and all of which are powered by the battery of the feature pack. Thus, the feature pack, using its own battery, takes on the burden of many of the processing tasks that would normally be performed by the portable device thus reducing the burden on the battery of the portable device. The battery of the feature is totally independent of the battery of any portable device coupled (mechanically or electrically or both) to the feature pack. Further the battery of the feature pack does not in any manner charge the battery of any coupled portable device.

One embodiment of the feature pack is shown in FIGS. 1-4. In particular, FIGS. 1-4 depict a feature pack that is designed to couple and/or interface with a portable electronic device and perform many of the features of the electronic device. In the embodiment shown in FIGS. 1-4, the feature pack shown is designed to interface and/or couple with a portable smart cellular telephone having a particular physical configuration. It will be understood, however, that the embodiment of the feature being discussed can be designed for different types of devices including portable electronic devices and other electronic devices; that is, the feature pack is not limited to be used only with a smart cellular telephones as discussed with respect to FIGS. 1-4. The embodiment shown in FIGS. 1-4 is used for illustrative and ease of explanation purposes and does not, in any manner, limit the usage of the feature pack to portable cellular telephones. Devices such as laptops, notebooks, and tablets can also be used with this embodiment of the feature pack.

Figure 1:
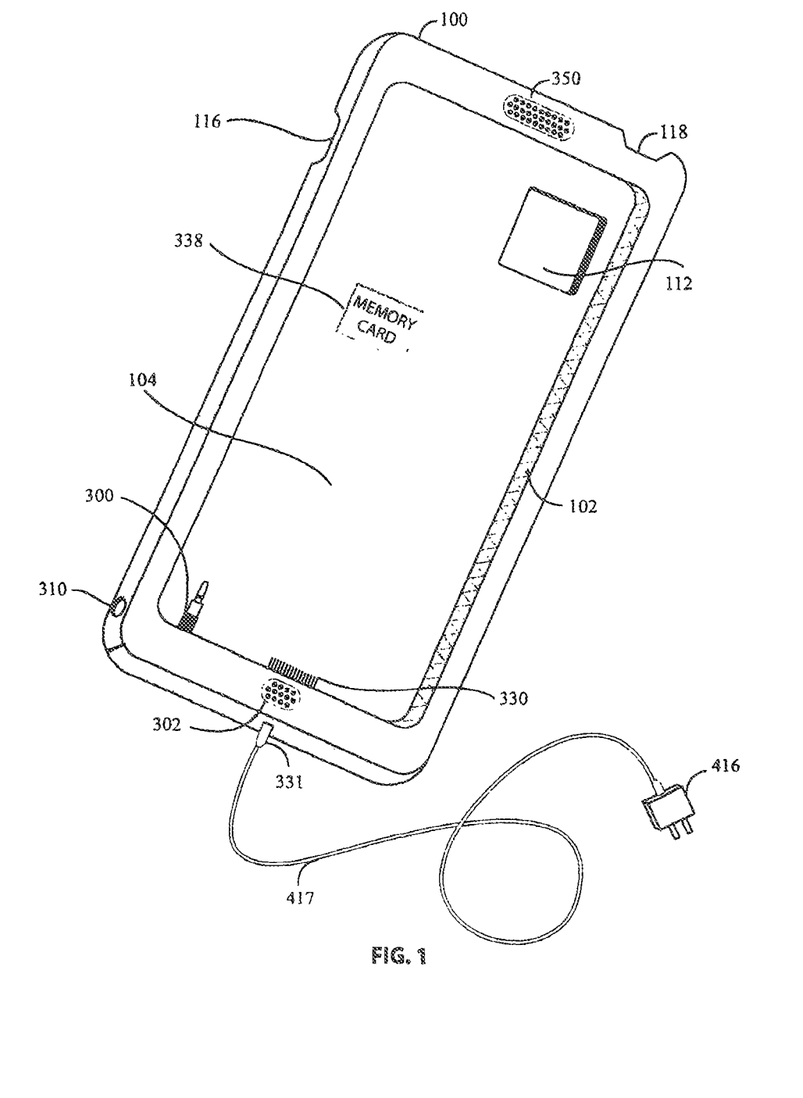
FIG. 1 is a perspective front view of one device embodiment of the feature pack.

Referring to FIG. 1, there is shown a perspective front view of an embodiment of the feature pack 100 designed for a cellular telephone. The feature pack 100 has a compartment 104 in which a cellular telephone (not shown) can be disposed and side, top and rear openings 116, 118 and 112 respectively. Feature pack 100 is designed so that a cellular telephone disposed in compartment 104 fits snugly within said compartment. Further, the cellular telephone is assumed to have a female RCA jack positioned so that when the phone is placed in compartment 104, male RCA jack 300 is in alignment with the corresponding female jack of the cellular phone and a connection is made. Similarly, male connector 330 of the feature pack aligns with a corresponding female connector (not shown) of the cellular phone. Male connector 330 is connected to connector 331, which is one end of external charger cord 417, the other end of which has an AC (Alternating Current) plug and charging circuit 416 that provides DC (Direct Current) power to the feature pack 100 and to the cellular telephone disposed within compartment 104. Feature pack 100 further has microphone 302 and telephone speaker 350. Also, feature pack 100 has a relatively small chamber within the rear surface of compartment 104 where a memory card 338 can be disposed. A metal strip 102 is fused into the material (e.g., rubber, silicone) used to construct the body of feature pack and this strip 102 can possibly be used for an additional antenna component for the feature pack. The material can be layered and voids (not shown) can be formed between the layers of the material wherein electronic circuits along with their components may reside. Also, shown is a female connector 310 that may be used to connect an external headset/microphone to feature pack 100 as discussed infra. The feature pack may also have a relatively large void for storing its battery. Other components of this embodiment of the feature pack are shown in FIG. 2.

Figure 2:
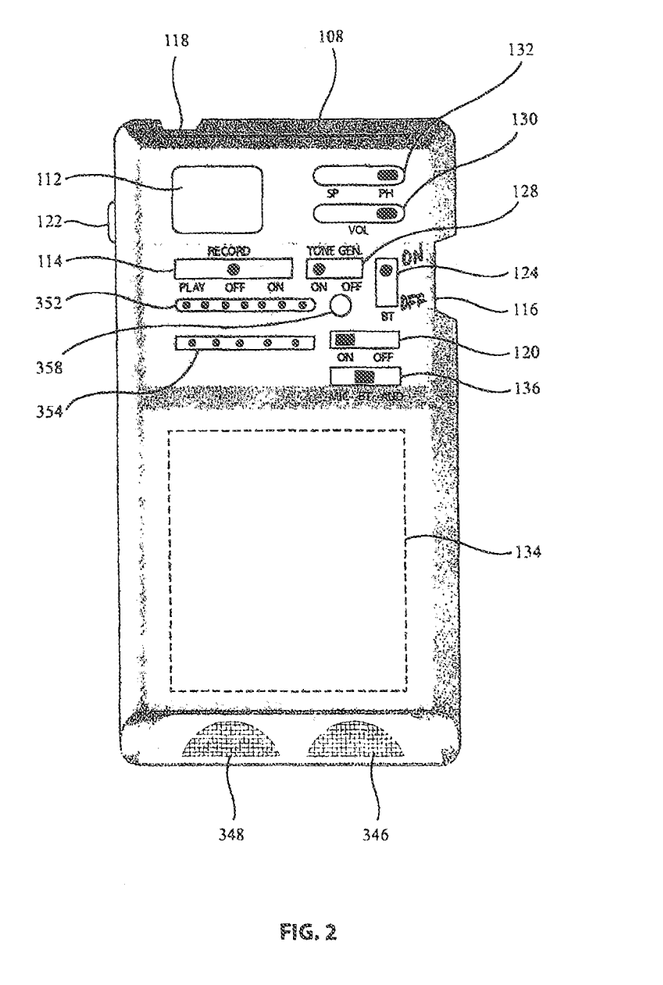
FIG. 2 shows the rear view of the device of FIG. 1 with various user actuators attached thereon.

Referring now to FIG. 2, there is shown a rear view of the feature pack 100 of FIG. 1. In particular feature pack 100 has openings 112 and 116, which may be used as access locations to control buttons and other user interface actuators of the cellular phone when snugly fit within compartment 104 of this embodiment of the feature pack. Opening 118 is another example of the feature pack 100 providing access to user actuators (e.g., buttons, sliding switches) of the cellular telephone when disposed in compartment 104 of the feature pack. A control button or a user accessible actuator of the feature pack 100 is an electrical or electro-mechanical component of the feature pack designed to be used, manipulated, operated or otherwise physically activated by a user of the feature pack to input signals, set conditions or otherwise alert the feature pack of occurrences of a physical condition initiated by the user. A metal strip 108 embedded in the material of the feature is available for use as an antenna for the feature pack or an antenna that can be coupled to an antenna of the portable device disposed in compartment 104. As will be discussed herein, the feature pack 100 has several user accessible actuators located on its rear surface whereby such actuators are directly electrically connected, coupled or otherwise interfaced to circuitry located within voids formed by the layers of material of the feature pack body 100.

Sliding control actuator (or volume control actuator) 130 has a sliding button, which can be slid right or left by a user to control the volume of speakers 348 and 346, which may be stereo speakers. Volume control actuator 130 can also be used to control the volume of speaker 350 (see FIG. 1) located at the front of the feature pack. Thus, depending on the speaker being used, volume control actuator 130 can directly control the volume of the selected speaker based on the manipulation of actuator 130 by a user. Actuator 132 may be a two-position actuator that allows a user to select which set of speakers he/she wants to use. In particular, the user may select to use speaker 350, say for a telephone call, or speakers 346 and 348 when listening to music originating from the telephone or from an external device in communication with the feature pack 100 via a blue tooth connection as will be described infra Audio recording actuator 114 is another type of sliding actuator; this actuator may be a three-position sliding actuator (Play-Off-On) whereby a user of the feature pack 100 can play recorded voice or audio signals stored in memory card 338 (see FIG. 1). Accordingly, a user can also record incoming voices, incoming audio signals, his/her own voice and any other audio signals that can be received by the feature pack or any other voice/sounds within the hearing vicinity of the feature pack user. The feature pack, of course, has a microphone 302 (see FIG. 1) that may be used for voice and/or sound recordings.

Figure 4:
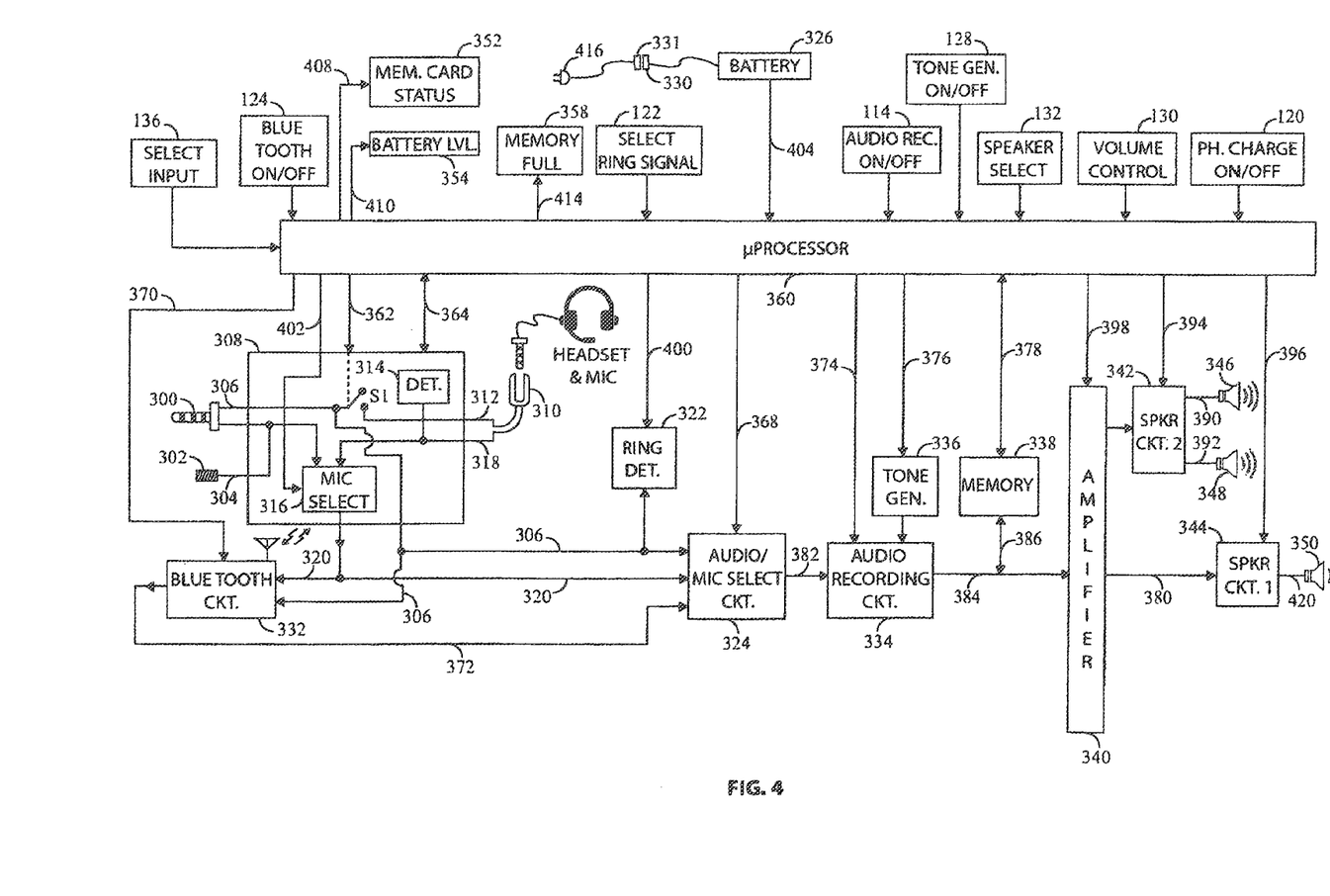
FIG. 4 is a block diagram of the circuitry for the embodiment of the feature pack shown in FIG. 1.

Continuing with the various actuators shown in FIG. 2, there is shown a two-position actuator 124 that can be used by a user of the feature pack to switch ON or OFF a Blue Tooth circuit 332 of the feature pack with the use of microprocessor 360 via one of its control lines 370 (See FIG. 4 infra). The feature pack 100 has a Blue Tooth circuit (which will be discussed infra; see FIG. 4, circuit 332) that can receive voice, audio and other types of signals from an external device paired with the feature pack 100. Also, the Blue Tooth circuit is able to transmit voice, audio and other types of signals to the external device. The term "Blue Tooth" is a well-known term that refers to a telecommunication standard developed to allow mobile or fixed devices to communicate with each other over relatively short distances using specifically defined electromagnetic signals.

Actuator 128 is a two-position switch and is used to switch ON or OFF a tone generator circuit (see FIG. 4, circuit 336), which is used by a user when recording a telephone call in order to comply with any law requiring that the user disclose to the party to whom he/she is talking that the call is being recorded and to periodically insert tones of certain frequencies into the conversation while the conversation is being recorded. The inserted tones are done with the tone generator circuit 336 (see FIG. 4 discussed infra) In addition to inserting tones into a conversation being recorded, the feature pack allows users to record various rings of the cellular telephone so that it can recognize when a cellular phone in compartment 104 is receiving a call. A ring tone detect 322 (see FIG. 4) circuit is able to detect the ring tone resulting from an incoming telephone call. Ring tone detect circuit is controlled by microprocessor 360 via control line 400 (see FIG. 4).

Actuator 122 is used to store the ring tones as will be discussed infra Components 352 and 358 are not actuators but are indicators (e.g., string of light units and one light component respectively as shown) of the status of the memory card 338, which are enabled or activated by microprocessor 360 via paths 408 and 414 respectively. When the memory card 338 is full, light component 358 is activated (via control line or path 414) indicating to the user that memory card 338 has reached its capacity. An outline 134 of the battery compartment for the feature pack is shown in dashed lines. Finally, two-position actuator 120 when set in an ON position causes a charge circuit 416 connected to the feature pack to charge the battery of the feature pack and also the battery of the cellular phone coupled to the feature pack. The status of the power level of the battery 326, which is connected to processor 360 via path 404, is indicated with light component 354 (comprising a plurality of individual light components as shown), which is coupled to microprocessor 360 via control line 410.

Figure 3:
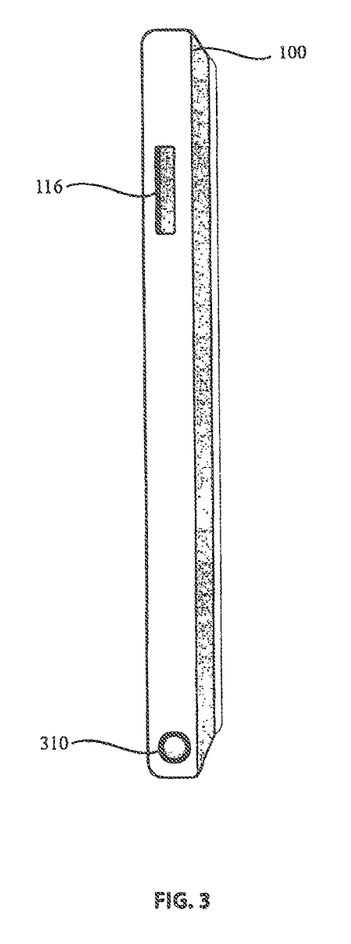
FIG. 3 is a left side view of the device of FIG. 1.

FIG. 3 shows the left side of FIG. 1 where a female RCA jack 310 is positioned to receive a male counterpart from an external headset-microphone device connected to the feature pack by a user. FIG. 3 also shows side opening 116. All of the aforementioned actuators engage directly the electrical and electronic circuits residing within voids formed by layers of material. A block diagram of such circuits and how they interface with their respective actuators is shown in FIG. 4.

Referring now to FIG. 4, the various circuits of the feature pack are shown. The feature pack is still being described in the context of a cellular telephone disposed within compartment 104. In order to fully describe the operation of the various circuits of the feature pack, at least three modes of operation of the feature pack will be discussed.

In a first mode of operation a device such as a cellular telephone is disposed in compartment 104 of the feature pack and thus such device is coupled to the feature pack via the male RCA jack 300 and a corresponding female RCA jack (not shown) of the cellular telephone. Also, in this mode of operation, the external headset/mic having microphone line 318 and audio line 312 as shown in FIG. 4 is not connected to this embodiment of the feature pack. It should be noted that a portable device such as a cellular telephone may have another type of connector with which it connects to external devices such as the feature pack. In other cases, the feature pack can be constructed and designed with a matching connector; that is, the feature pack design is not limited to only one type of connector. The connection between the feature pack and the cellular telephone thus disconnects audio and microphone lines of the female RCA jack connector (not shown) from circuits within the cellular phone. The signals on the audio line and microphone line of the female connector (not shown) of the cellular telephone are thus available to the feature pack as those lines are now directly connected to RCA jack 300 and are no longer connected to the internal circuitry of the cellular telephone. In interface circuit 308, the microphone line 304 of the feature pack is connected to the microphone line of the RCA jack 300. Also, audio line 306 of the RCA jack 300, which is now connected to the audio line of the cellular telephone, is also connected to one end of switch S1 and to the input of Audio/Mic select circuit 324 as shown. Because the external headset and microphone shown in FIG. 4 are not connected to the feature pack, the detection circuit 314 does not detect any energy on microphone line 318 of the external headset/mic and sends an appropriate signal to microprocessor 360 via two-way control line 364. In response, microprocessor determines that no external headset/mic is connected to female RCA jack 310 and thus keeps switch S1 in the open position as shown. Also, there are no signals on audio line 312 of the external headset and microphone when it is not connected to the feature pack or when switch S1 is open as shown.

Continuing with this first mode of operation, in the embodiment shown and considering the discussion above, there are three signals that can be received by the feature pack. They are (i) signals from audio line 306 which are audio signals being received by RCA jack 300 from the cellular telephone disposed in compartment 104 of the feature pack; (ii) signals from microphone line 304 of the feature pack; because the headset/microphone is not connected to the feature pack, there are no microphone signals on line 318 (no energy detected by detector 314) and thus microprocessor 360 sends a control signal via control line 402 to select microphone 302 to allow signals from microphone 302 to pass through Mic Select circuit 316 to path 320 and onto the input of Audio/Mic select circuit 324; and (iii) Blue Tooth signals received wirelessly by Blue Tooth circuit 332.

In particular, microphone signals from male RCA jack 300 and female RCA jack 310 are fed to Mic Select circuit 316. Because no energy is detected by Detection circuit 314 Microprocessor 360 receives a signal from circuit 314 via path 364 indicating that the headset and microphone are not connected (no energy is detected on the microphone line 318; i.e., no signal from female RCA jack 310) and thus keeps switch S1 open and selects the microphone 302 of the feature pack; that is, signals from microphone 302 appear on microphone line 304 and are caused to be routed through microphone select circuit 316 onto path 320 to one of the inputs of Audio/Mic Select circuit 324 and Blue Tooth circuit 332. Signals on Audio line 306, which may be audio signals from the cellular phone disposed in compartment 104 of the feature pack, are present at the input to Audio/Mic select circuit 324 and input to Blue Tooth circuit 332 on path 306. Finally, signals received wirelessly by Blue Tooth circuit 332 appear on path 372 and are thus present at the input to Audio/Mic Select circuit 324

Therefore, the input to Audio/Mic Select circuit 324 may be (i) a signal from the external portable device coupled and interfaced with the feature pack, (ii) a wireless signal received by the Blue Tooth circuit 332 or (iii) a signal from the microphone 302 of the feature pack.

Depending on the setting selected by a user of the feature pack for actuator 136, (see also FIG. 2), one of the inputs to Audio/Mic select circuit 324 will be selected by microprocessor 306 with the use of a control signal sent by the microprocessor via control line 368. For example, if the user sets the Blue Tooth actuator 124 to its ON position, and the Select Input actuator 136 is set to BT (i.e., Blue Tooth) then the Blue Tooth signal on path 372 will be selected (recorded and stored if actuator 114 is set to ON) and played on either speakers 346, 348 or speaker 350 depending on the set of speakers selected by the user using actuator 132. If, however, Blue Tooth actuator 124 is set to the MIC (microphone) position, the signal from microphone 302 is selected (recorded and stored if actuator 114 is set to ON) and played on either speakers 346, 348 or speaker 350 depending on the set of speakers selected by the user through the user of actuator 132. Finally, if actuator 136 is set to AUD (audio), then the signal on path 306 is passed through circuit 324 to path 382 (recorded by audio recording circuit 334 enabled by microprocessor 360 via control line 374 and stored in memory 338 via paths 384 and 386 if actuator 114 is set to ON) and played on speakers 346, 348 via path 384, amplifier 340, speaker circuit 342 and paths 390 and 392 respectively or on speaker 350 via path 384, amplifier 340, path 380, speaker circuit 344 and path 420 depending on the set of speakers selected by the user through the use of actuator 132. The selection of the input is done by microprocessor 360, which transmits the proper control signal to Audio/Mic Select circuit 324 via control line 368. The microprocessor 360 enables audio recording circuit 334 via control line 374, enables Tone Generator circuit 336 via control line 376, communicates with memory circuit 338 via path 378, controls amplifier 340 via control line 398 and controls speaker circuits 342 and 344 via control lines 394 and 396 respectively.

It should be noted that in this first mode of operation, the broadcasting of Blue Tooth signals by Blue Tooth circuit 332 is received by any device having Blue Tooth capability and where said device is paired with the Blue Tooth circuit 332 of the feature pack. The feature pack will automatically pair with nearby Blue Tooth devices, which have been loaded with a code associated with the feature pack. In this first mode, signals received wirelessly are presented onto path 372, recorded, stored and played in real time through the front speaker 350 or the rear stereo speaker 346 and 348. Also, either audio signals on path 306 or microphone signals (from headset microphone or microphone 302) on path 320 are transmitted to nearby external Blue Tooth-enabled devices. The feature pack can be designed so that audio signals from path 306 are transmitted to nearby Blue Tooth devices and that the microphone signals are not transmitted by the Blue Tooth circuit 332; this can be a default setting, which can be changes based on user preference.

In the case of interruptions where the feature pack is operating in the first mode and an interrupting signal of relatively high priority is received, the feature pack may be programmed to a default setting for such occurrences. For example, when the device disposed in compartment 104 of the feature pack is a cellular phone or any other device with communication capabilities and an incoming call has been detected, a ring detect circuit 322 will detect the ring and temporarily postpone whatever task, if any, was being performed by the feature pack and answer the call. The feature pack is able to detect a ring because the ring signal will be present on audio line 306, which is directly connected to ring detect circuit 322. The various ring signals of the device disposed in compartment 104 can be stored in ring detect circuit 322 as follows.

Select ring signal button 122 is depressed twice in quick succession signaling to the feature pack that the user desires to store one or more rings in ring detect circuit 322. The user can then operate the device in compartment 104 to generate different rings and after each ring, the user depresses the ring select button 122. This procedure can be repeated as many times as the number of rings that the user desires to store. The user can then again depress button 122 twice in quick succession to signal end of storing of rings. When any of the stored rings are detected, the feature pack selects path 306 using the proper control signal on control line 368 to allow the user to participate in the telephone call. The user can record the phone call by activating 114 to the ON position and setting actuator 128 to the ON position so that audio tones are injected into the conversation notifying the calling party that the call is being recorded. The user of the feature pack preferably also advises the calling party that the call is being recorded in addition to switching ON the Tone Generator 336.

In the second mode of operation, the headset shown is connected to the feature pack. Still referring to FIG. 4, when the headset is connected (via female RCA jack connector 310; see FIGS. 3 and 4), whether an external device is positioned within compartment 104 of the feature pack is irrelevant. This is because, once microprocessor 360 receives a signal from Detector circuit 314 indicating that a second microphone has been detected and thus an external Headset/Microphone has been connected to the feature pack, the feature pack gives priority to the external headset. In particular, microprocessor 360 causes switch S1 of input circuit 308 to close (by transmitting the proper control signal onto control signal line 362) thus connecting audio line 306 to audio line 312 to the external headset. Further, the microphone of the headset is selected by microprocessor 360 (with a control signal on control signal line 402) at Mic Select circuit 316. The user still has the capability to record either his voice from the use of the headset microphone or any signal on path 306. Either one of these signals can be selected by the user through activation of actuator 136 to the proper position. As with the first mode, the user activates actuator 114 to the ON position to do a recording. Also, as with the first mode, an incoming call will be handled by the feature pack Ring Detect circuit 322 detecting a ring signal and then allowing the user to answer the call using the external headset/microphone. Microprocessor 360 selects path 306 in case the user wants to record the call. Again, as with the first mode, the user preferably switches ON the Tone Generator 336 and notifies the calling party that the telephone call is being recorded. The recorded call is stored in detachable memory card 338 as previously described.

Upon termination of the telephone call, the feature pack returns to the task, if any, that it was performing immediately prior to the telephone call.

In a third mode of operation, there is no external device connected to the feature pack. In this mode, the feature pack can be receiving signals via the Blue Tooth circuit 332 and may also be used to record a user's voice when the external headset/microphone is connected to the feature pack. When the headset/microphone is not connected to the feature pack, the microphone 302 of the feature pack can be used to record voice signals and other sounds detected by microphone 302.

Referring temporarily to FIG. 2, when actuator 124 is set to ON and actuator 132 136 is set to BT (for Blue Tooth), and the feature pack is paired with a nearby device, the signals received via Blue Tooth circuit of FIG. 4 are on path 372, which is one of the inputs to Audio/Mic select circuit 324. Continuing with FIG. 4, when no headset/mic is connected to the feature pack and actuator 136 is set to BT (for Blue Tooth) the Blue Tooth signals are selected by Audio/Mic select circuit 324 and such signals appear on path 382 where they may be recorded by audio recording circuit 334 when actuator 114 is set to ON. The recorded Blue Tooth signals may then be stored within memory card 338. Also, the Blue Tooth signals on path 382 may be amplified by amplifier 340 and applied to either stereo speakers 346 and 348 or speaker 350 depending on which set of speakers is selected through the use of actuator 132. Continuing with FIG. 4, if the headset microphone is connected to the feature pack, then Detection circuit 314 will detect energy from the microphone of the headset and send that information to microprocessor 360. The microprocessor 360 will activate Mic Select circuit 316 to pass signals from the headset microphone onto path 320, which is another input to Audio/Mic select circuit 324. If the actuator 114 is set to ON and actuator 136 is set to MIC, then the signals from the headset microphone are selected (by microprocessor 360 sending the proper control signal onto control line 368), and thus appear on path 382 to the input of Audio recording circuit 334 where they are recorded and stored in memory 338 via paths 384 and 386. A user can thus use the feature pack as a personal recording device.

Still continuing with FIG. 4, when the headset/microphone device is not connected to the feature pack via RCA female jack 310, the microprocessor 360 selects feature pack microphone 302 (through a control signal on control line 402) and all signals (i.e., voice and/or sounds) captured by microphone 302 are transferred onto path 320 and appear at one of the inputs to Audio/Mic Select circuit 324. When actuator 136 is set to MIC, the signals from microphone 302 are selected and pass onto path 382. If actuator 114 is set to ON, then the sounds and/or voices from microphone 302 are recorded and stored in memory card 338. It is thus that the feature pack can be used to record sounds, voices and other types of audio signals. For example, a user at a conference or attending a meeting may use the feature pack to record such events.

Figure 5:
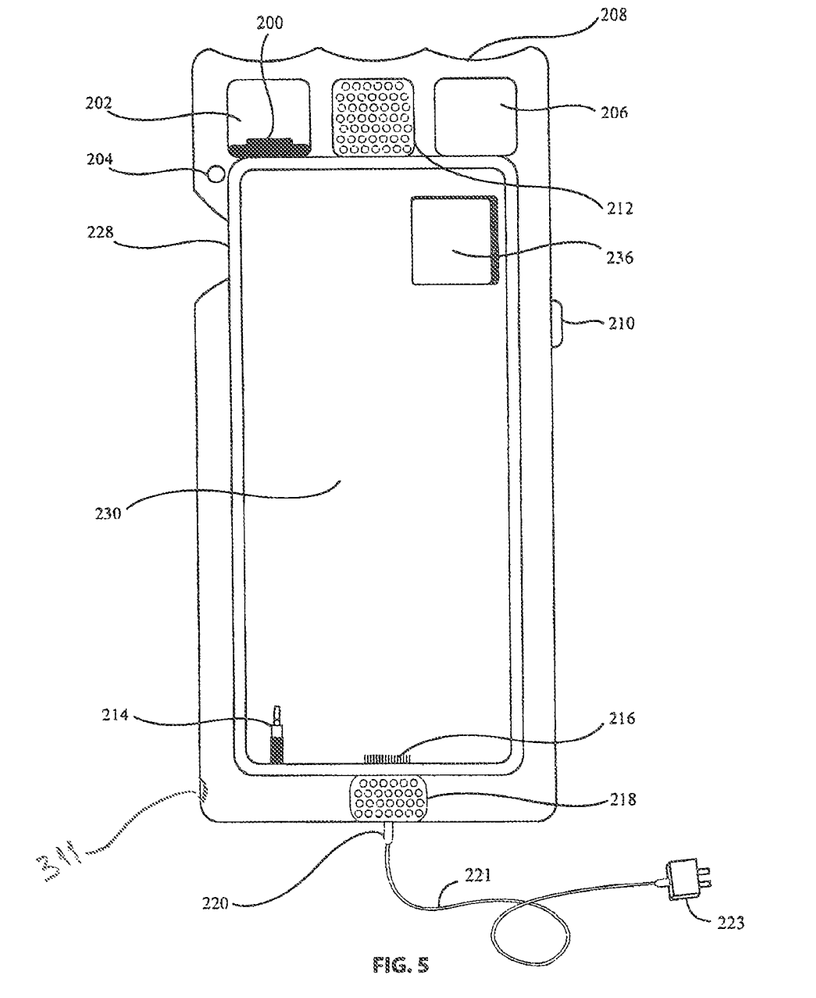
FIG. 5 shows a second embodiment of the feature pack.
Figure 6:
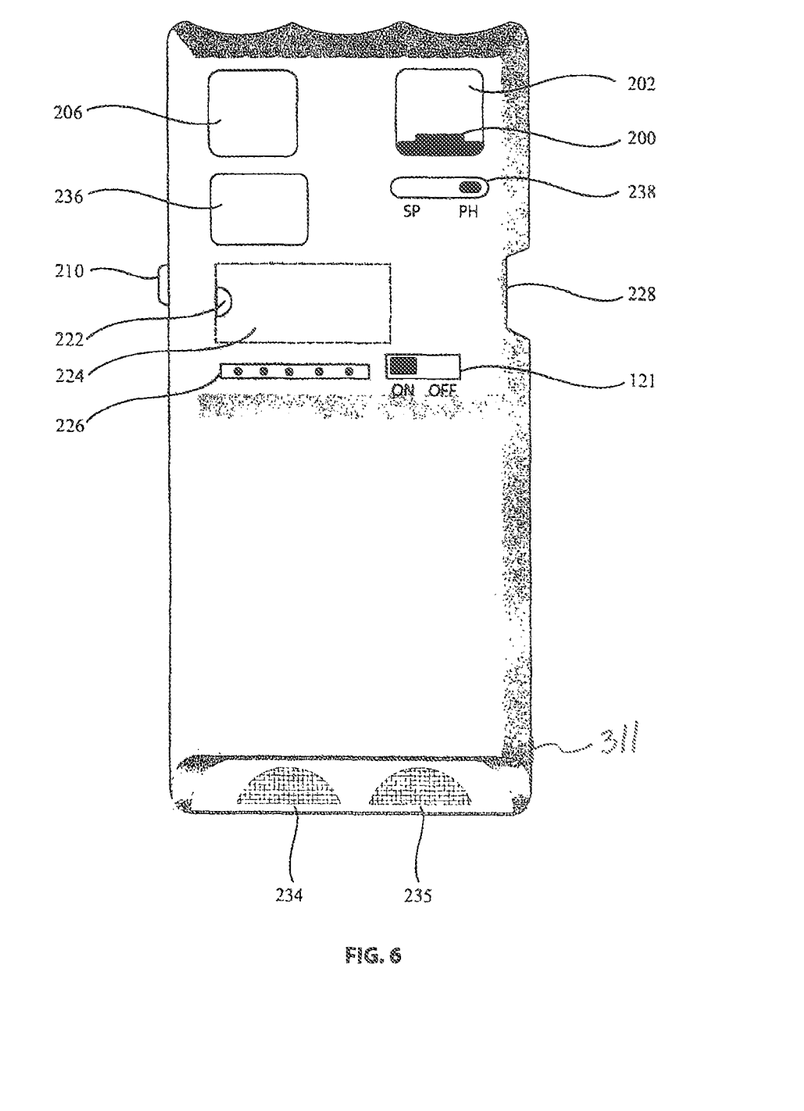
FIG. 6 is a rear view of FIG. 5.
Figure 7:
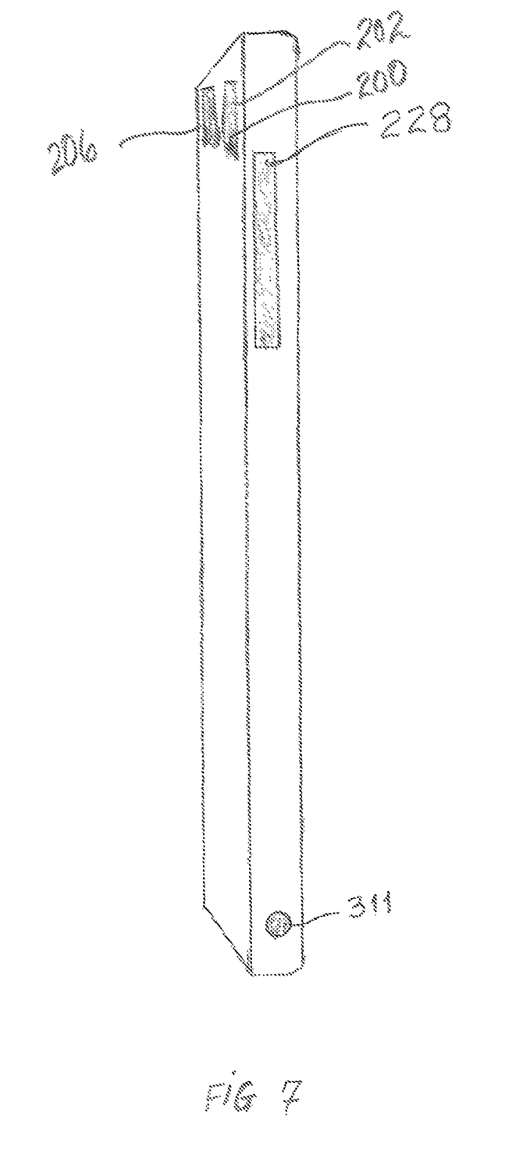
FIG. 7 is a left side view of the device of FIG. 5.

Referring now to FIGS. 5-7, another embodiment of the feature pack is shown. This embodiment operates in much the same fashion as the embodiment of FIGS. 1-4 including the operation of the circuitry disclosed in FIG. 4. FIG. 5 shows a front view of a feature pack having a speaker 212, a microphone 218, a compartment 230, within which a portable device (such as a cellular telephone) can be snugly disposed. The portable device can connect to the feature pack via male RCA jack 214 or some other connector appropriate for the portable device. There is also an RCA female jack 311 that operates in much the same fashion as female jack 310 of FIG. 1. The feature pack of FIG. 5 also contains connector 216 that interfaces with charger 220 comprising a connector at one end and an AC plug at the other end. The feature pack of FIG. 5 further has an extended portion part of which is a rest area 208 for a user's finger. The rest area is directly above an opening 206 through which a user can pass through a chain like object or a string like object to carry the device around his/her neck. Speaker 212, is positioned so as to be useful to users who are hearing impaired. A mechanical switch 200, which when depressed by a user causes light 204 (may be an LED) to illuminate thus serving as a small flashlight to assist users in poorly lit situations, where for example, a user has difficulty inserting his/her key into a keyhole. The mechanical switch 200 can be accessed through opening 202. Opening 236 may be used depending on the architecture of the portable device residing in compartment 230. For example, opening 236 shown in FIG. 6 may be an opening for a camera lens available in many portable devices such as cellular telephones.

FIG. 6 is a rear view of FIG. 5 showing openings 206, 236 and 202 already discussed above. Further, FIG. 6 show an actuator 238 that can be set by a user of the feature pack to select which speakers he/she wants to use. Stereo speakers 234 and 235 are shown positioned at the bottom of FIG. 6. Speaker 212 can be seen in FIG. 5 where it is shown positioned at the top of the feature pack. Actuator 210 (also shown in FIG. 5) is a sliding volume control actuator used to control the volume level of the speakers. FIG. 7 shows a left side view of FIG. 5. FIG. 7 also shows opening 228 (also depicted by FIGS. 5 and 6) which is used to allow access to actuators of a cellular phone disposed within the feature pack of FIG. 5; that is within opening 230. FIG. 7 further shows opening 202 with push button 200 and opening 206 of FIGS. 5 and 6. The compartment 224 shows the outline of the space 224 and a pull out opening 222 providing access to the compartment in which a magnifying glass can be stored.

Figure 8:
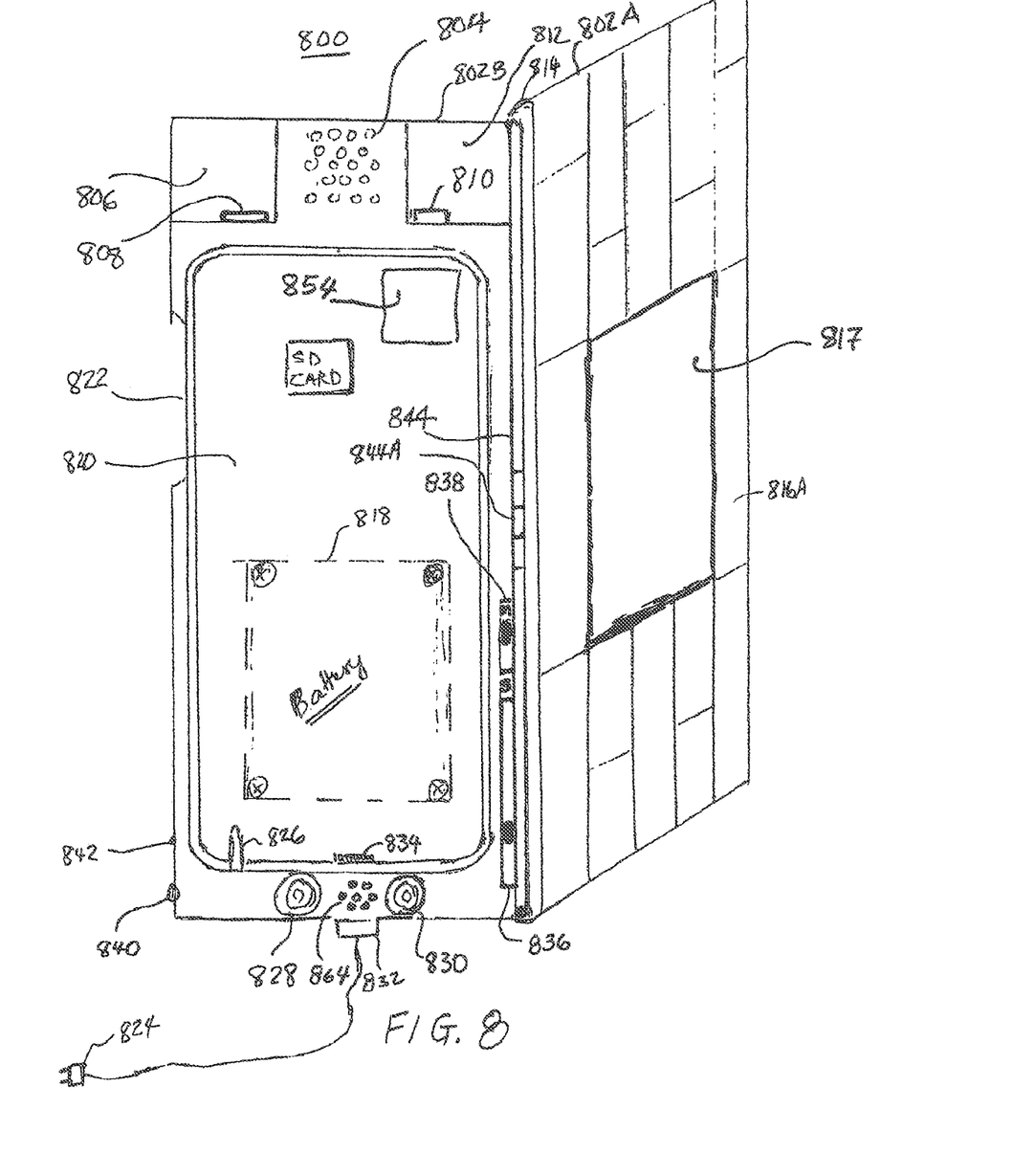
FIG. 8 is a front view of a third embodiment of the feature pack.

Referring now to FIG. 8, there is shown a third embodiment of the feature pack. The feature pack 800 has a body 802B with a compartment 820 wherein a portable communication device such as a cellular telephone can be disposed. Within the body of the feature pack is a cavity 818 (outlined with dashed lines as shown) for the battery. The body 802B has a door 802A hingedly connected thereto (with hinge 814) where such door has solar panels (e.g., 816A on one side and 816B on the other side which are exemplary representations thereof) on either side of the door 802A, and which are used to charge the battery using conventional well-known circuitry. When door 802A is positioned to cover the side of the feature pack having opening 820, hinge 814 covers a side of the feature pack, but such hinge 814 may be made of transparent material such that the level tool 844 and bubble level tool bubble 844A can still be seen even when the door 802A is in a closed position covering opening 820 of feature pack 800. Alternatively an opening may be provided by cutting out portions of hinge 814 to allow the level tool to be viewable even when door 802A is in its closed position; that is, when door 802A is covering opening 820 of the feature pack of FIGS. 8 and 9. Both sides of the door 802A are virtually entirely covered with solar panels where 816A and 816B are mentioned as representative implementations of the panels. It is understood that the there are more than one solar panel on either side of the door 802A as shown. Further, at least one of the panels is a mirror 817 and not a solar panel. A relatively highly reflective material can be used in place of the mirror.

The body 802B has openings 812, 806 and 854 for access to a power on/off switch 810 of a cell phone (not shown) disposed in compartment 820, access to a power on/off switch 808 for an LED (Light Emitting Diode 852; see FIG. 9) positioned on the opposite side of the body, and an opening for a camera lens/flash of a cellular phone (not shown) disposed in compartment 820 respectively. The body also has side opening 822 that provides access to actuator of the cellular (not shown) phone disposed within compartment 820. On the right hand side of body 802B is a level tool 844 having a level bubble indicator 844A. Two sliding switches 836 and 838 are mounted near the level 844 on the body 802B. Switch 836 is a volume control switch for either stereophonic speakers 828 and 830 or mono speaker 804 depending on the position of switch 838; that is switch 838 can be actuated to select S for the stereophonic speakers 828 and 830 or M for the mono speaker 804. As with the other embodiments, the embodiment of FIG. 8 has a microphone 864, a male RCA jack 826 (or equivalent depending on the device disposed in compartment 820), charger connector 834 used to connect to connector 832 whose other end is charger 824. It should be noted that charger 824 and associated connector 832 are not part of this embodiment of the feature pack. The feature pack of FIG. 8 further has a side female jack opening 840 and a laser 842 used to measure distances.

Figure 9:
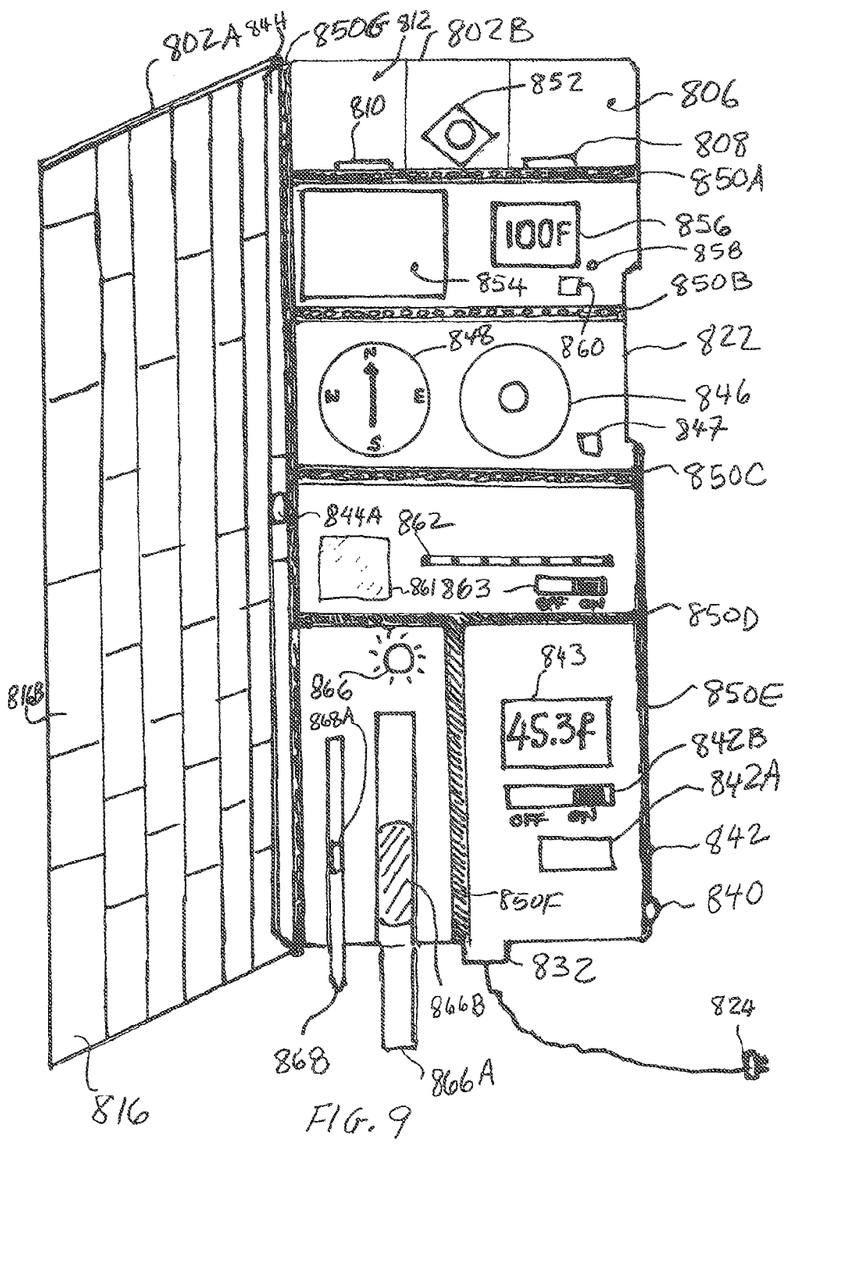
FIG. 9 is a rear view of FIG. 8.

Referring now to FIG. 9, there is shown the rear of FIG. 8 with various tools appended or mounted (or both appended and mounted) onto a surface (e.g., the rear surface) of the feature pack of FIGS. 8 and 9. Each such tool may be operable with the use of a mechanical, electrical or electromechanical actuator, or switch that may engage one or more of the plurality of circuits (some of which are not shown or discussed with respect to FIG. 4) positioned within voids formed by the material from which the body of the feature pack of FIG. 9 is made; these circuits are in addition to the circuits shown in FIG. 4. A compass tool 848 is positioned next to a camera 846 with associated switch 847. The camera 846 and associated switch have one or more associated well-known circuitry (not shown) positioned within a void formed by the material from which the body of the feature pack of FIG. 9 is made. Further, a temperature sensor tool 861 for measuring surface and ambient temperature is also mounted onto the rear of body 802B as shown. Pushbutton switch 860 is used to cause a temperature measurement to be shown by display 856 with LED 858 acting as an indicator for indicating when the temperature has surpassed a certain threshold. Any well known circuit (not shown) electrically connected to the LED 858, temperature sensor 861, push button switch 860 and temperature sensor 861 can be used to facilitate the operation of these devices and/or tools.

Figure 10:
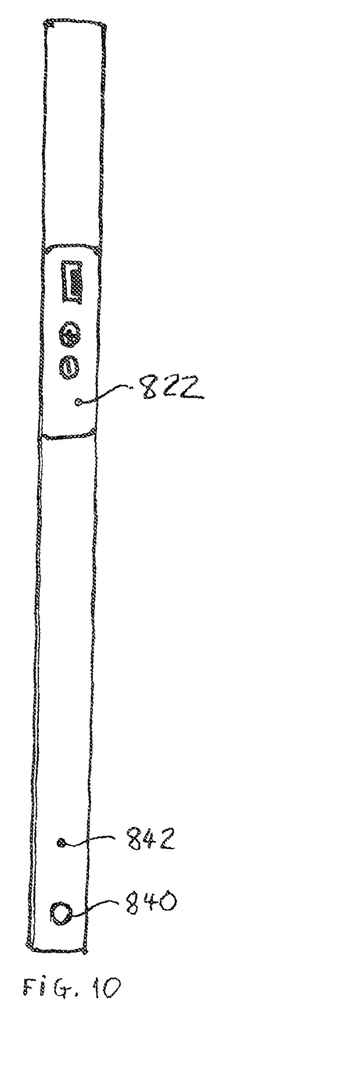
FIG. 10 is a left side view of FIG. 8.
Figure 11:
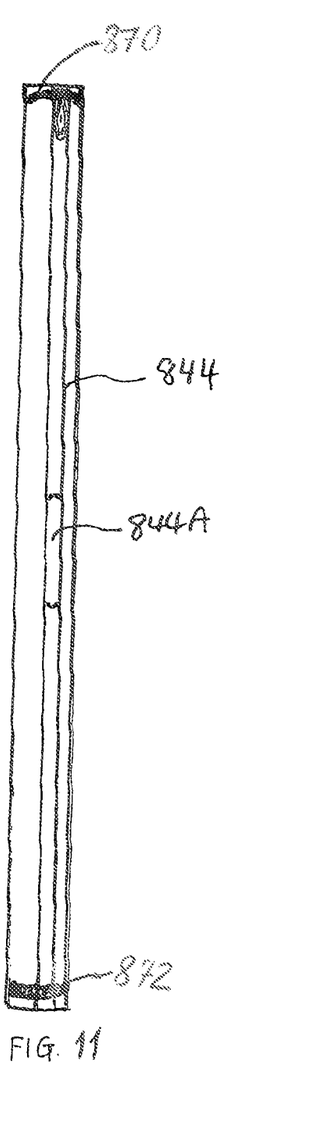
FIG. 11 is a right side view of FIG. 8.

As discussed previously pushbutton switch 808 is used to activate light 852 (may be implemented with an LED); that is, turn light 852 ON or OFF. A battery level indicator 862 comprising of bars of LEDs is used to indicate the level of battery power. The battery can be charged or not charged depending on the position of switch 863; any well known charging circuit (not shown, but positioned within a cavity of the feature pack) can be used to charge the battery positioned within a cavity of the feature pack of FIG. 9; the outline 818 of such a cavity is shown in FIG. 8. However, it is to be understood that the battery is also charged by the solar panels appended onto both surfaces of the door, which panels charge the battery whenever they are activated by sources of light. The rear of body 802B further has a tester 866A for detecting electric current similar to an electrician's tool. Associated with the tester 866A is an LED or light 866, which blinks at a relatively rapid rate or is turned ON when electrical current or voltage is detected. A sliding actuator 866B allows a user to slide the tester 866A in or out of a cavity within the body of the feature pack. A writing implement (i.e., a pen or pencil) 868 which can also be slid with actuator 868A into and out of a cavity of the body of the feature pack is also shown. Laser 842 measures distances which are displayed by display 843 where such display is triggered upon pushbutton 842A being pressed by a user. Switch 842B when in the ON position allows the laser to measure distances and when in the OFF position deactivates the laser. One or more well known circuits (not shown) associated with laser 842, switch 842B, and push button switch 842A may be positioned within voids formed by materials from which the body of the feature pack of FIGS. 8 and 9 is made. The rear of the body of the feature pack (of FIGS. 8 and 9) also has various ribs protruding from the rear surface of the feature pack of FIGS. 8 and 9. There are horizontal ribs 850A-D and vertical ribs 850E-G. There are also ribs on the side surface as shown in FIG. 11, viz., ribs 870 and 872. The ribs extend from the respective surfaces on which they are mounted to provide protection to the various tools and actuators mounted onto the surface FIG. 11 also shows the level 844 and level bubble 844A. FIG. 10 shows the laser 842 and female RCA jack 840. Opening 822 is also shown in FIG. 10 where said opening exposes certain actuators, which are not part of the feature pack because they are part of a device such as a cellular phone disposed within compartment 820 of the feature pack.

It will be readily understood that the various aforementioned tools and circuits of the feature pack that need power to operate are provided power by the battery of the feature pack.

While various aspects of different embodiments have been described above, it should be understood that they have been presented by way of example and not limitation. It will be apparent to persons skilled in the relevant art(s) that various changes in form and detail can be made therein without departing from the spirit and scope of the embodiments of this disclosure. Thus, the discussed embodiments should not limit by any of the above described exemplary aspects, but should be defined only in accordance with the following claims and their equivalents.

In addition, it should be understood that the figures in the attachments, which highlight the structure, methodology, functionality and advantages of the various embodiments, are presented for example purposes only. This disclosure and all its embodiments are sufficiently flexible and configurable, such that it may be implemented in ways other than that shown in the accompanying figures.

What is claimed is:

1. A feature pack comprising:
   a body having a compartment for a portable device to be disposed therein, a first connector for coupling to the disposed device, and a second connector for coupling to an external device wherein at least one circuit positioned within the body is configured to process a first signal type, a second signal type, and a third signal type wherein the first and second signal types comprise signals on signal lines coupled to the first and second connectors respectively, and the third signal type comprises wireless signals received by the feature pack;
   a select circuit having an output, and having at least one input for receiving the first, second, and third signal types and configured to output at least one of said first, second and third signal types based on a control signal transmitted by a microprocessor coupled to the select circuit via a control signal line, the microprocessor is also coupled to at least one user accessible actuator and actuator circuitry wherein the control signal is at least based on activation or setting of the at least one user accessible actuator;

at least one processing circuit coupled to the output of the select circuit for processing an output signal from the select circuit; and at least one tool mounted on a surface of the feature pack, the at least one tool being coupled to the at least one user accessible actuator for operation of the at least one tool.

2. The feature pack of claim 1 where the at least one toot is a temperature sensor.

3. The feature pack of claim 1 where the at least one tool is a camera.

4. The feature pack of claim 1 where the at least one tool is a tester for detecting electric current.

5. The feature pack of claim 1 where the at least one toot is an LED light source.

6. The feature pack of claim 1 where the at least one tool is a laser tool for measuring distances.

7. The feature pack of claim 1 where the at least one tool is a temperature threshold detector.

* * * * *